United States Patent
Kwak et al.

(10) Patent No.: US 11,157,760 B2
(45) Date of Patent: Oct. 26, 2021

(54) LIVENESS TEST METHOD AND APPARATUS

(71) Applicant: Samsung Electronics Co., Ltd., Suwon-si (KR)

(72) Inventors: Youngjun Kwak, Seoul (KR); Byung In Yoo, Seoul (KR); Youngsung Kim, Suwon-si (KR); Chang Kyu Choi, Seongnam-si (KR); Jaejoon Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 89 days.

(21) Appl. No.: 16/224,970

(22) Filed: Dec. 19, 2018

(65) Prior Publication Data
US 2019/0197331 A1 Jun. 27, 2019

(30) Foreign Application Priority Data

Dec. 21, 2017 (KR) ........................ 10-2017-0177240

(51) Int. Cl.
*G06K 9/00* (2006.01)
*G06K 9/62* (2006.01)
(Continued)

(52) U.S. Cl.
CPC ......... *G06K 9/00906* (2013.01); *G06F 16/00* (2019.01); *G06F 21/32* (2013.01);
(Continued)

(58) Field of Classification Search
CPC ...... G06F 21/32; G06F 16/583; G06F 19/321; G06F 21/6218; G06F 2221/2133;
(Continued)

(56) References Cited

U.S. PATENT DOCUMENTS 7,184,100 B1 * 2/2007 Wilf ...................... G11B 27/28
348/700
7,848,544 B2 12/2010 Mariani
(Continued)

FOREIGN PATENT DOCUMENTS

CN 104751108 A 7/2015
JP 2000-306095 A 11/2000
(Continued)

OTHER PUBLICATIONS

Akbulut "Deep Learning based Face Liveness Detection in Videos," 2017, IEEE (Year: 2017).*
(Continued)

*Primary Examiner* — Alex Kok S Liew
(74) *Attorney, Agent, or Firm* — NSIP Law

(57) ABSTRACT

A processor-implemented liveness test method includes detecting a face region in a query image, the query image including a test object for a liveness test, determining a liveness test condition to be applied to the test object among at least one liveness test condition for at least one registered user registered in a registration database, determining at least one test region in the query image based on the detected face region and the determined liveness test condition, obtaining feature data of the test object from image data of the determined at least one test region using a neural network-based feature extractor, and determining a result of the liveness test based on the obtained feature data and registered feature data registered in the registration database and corresponding to the determined liveness test condition.

20 Claims, 12 Drawing Sheets

(51) Int. Cl.
| | |
|---|---|
| *G06F 21/62* | (2013.01) |
| *G06N 3/02* | (2006.01) |
| *G06K 9/46* | (2006.01) |
| *G06F 21/32* | (2013.01) |
| *G06F 16/00* | (2019.01) |
| *G06T 7/60* | (2017.01) |
| *G06T 7/70* | (2017.01) |
| *G06N 3/04* | (2006.01) |

(52) U.S. Cl.
CPC ..... *G06F 21/6218* (2013.01); *G06K 9/00228* (2013.01); *G06K 9/00268* (2013.01); *G06K 9/00926* (2013.01); *G06K 9/4628* (2013.01); *G06K 9/6215* (2013.01); *G06K 9/6272* (2013.01); *G06N 3/02* (2013.01); *G06N 3/0454* (2013.01); *G06T 7/60* (2013.01); *G06T 7/70* (2017.01); *G06T 2207/20084* (2013.01); *G06T 2207/30201* (2013.01)

(58) Field of Classification Search
CPC ................ G06F 21/31; G06K 9/00228; G06K 9/00261; G06K 9/00268; G06K 9/00906; G06K 9/00221; G06K 9/00288; G06K 9/00; G06K 9/38; G06K 9/00926; G06K 9/4628; G06K 9/6215; G06K 9/6272; G06K 9/00899; G06K 9/00255; G06K 9/00281; G06K 9/00624; G06K 9/4652; G06K 9/00597; G06K 9/00791; G06K 9/2027; G06K 9/4661; G06K 9/66; G06K 9/00248; G06K 9/00295; G06K 9/00335; G06K 9/00107; G06K 9/00114; G06K 9/0061; G06K 9/6274; G06K 9/0002; G06K 9/00093; G06K 9/001; G06K 9/0012; G06K 9/00315; G06K 9/00617; G06K 9/3233; G06K 9/46; G06T 7/70; G06T 7/0012; G06T 2207/30201; G06T 7/60; A61B 5/0064; A61B 5/0086; A61B 5/015; A61B 5/1077; A61B 5/411; A61B 5/415; A61B 5/418; A61B 5/4519; A61B 5/7264; G06N 3/02; H04L 63/0861; H04L 63/10; H04L 63/102; H04L 67/22; H04L 67/36; H04L 63/1483; H04L 63/0853; G07C 9/37; G01K 13/002; G06Q 50/22; Y02A 90/22; Y02A 90/26
USPC ............. 382/103, 107, 118; 348/77, 78, 700
See application file for complete search history.

(56) References Cited

U.S. PATENT DOCUMENTS

| | | | |
|---|---|---|---|
| 8,856,541 B1 | 10/2014 | Chaudhury et al. | |
| 9,996,684 B2* | 6/2018 | Hoyos | G06Q 20/40145 |
| 2010/0172567 A1* | 7/2010 | Prokoski | A61B 5/415 |
| | | | 382/132 |
| 2010/0189313 A1* | 7/2010 | Prokoski | A61B 5/015 |
| | | | 382/118 |
| 2010/0290668 A1* | 11/2010 | Friedman | G06K 9/00255 |
| | | | 382/103 |
| 2012/0328164 A1* | 12/2012 | Hoyos | G06K 9/00906 |
| | | | 382/115 |
| 2014/0337930 A1* | 11/2014 | Hoyos | G06Q 20/40145 |
| | | | 726/4 |
| 2016/0063314 A1* | 3/2016 | Samet | G06K 9/00906 |
| | | | 348/78 |
| 2016/0328623 A1* | 11/2016 | Kim | G06K 9/00228 |
| 2016/0335483 A1* | 11/2016 | Pfursich | H04W 12/0605 |
| 2017/0109593 A1 | 4/2017 | Schueren et al. | |
| 2017/0150090 A1 | 5/2017 | McHenry et al. | |
| 2018/0276488 A1 | 9/2018 | Yoo et al. | |
| 2019/0073580 A1* | 3/2019 | Dzhulgakov | G06N 3/0454 |

FOREIGN PATENT DOCUMENTS

| | | |
|---|---|---|
| JP | 4925097 B2 | 4/2012 |
| JP | 5554984 B2 | 7/2014 |
| KR | 10-0862526 B1 | 10/2008 |
| KR | 10-2011-0093425 A | 8/2011 |
| KR | 10-1441108 B1 | 9/2014 |
| KR | 10-2016-0011916 A | 2/2016 |
| KR | 10-1647803 B1 | 8/2016 |
| KR | 10-2016-0119932 A | 10/2016 |
| KR | 10-2018-0109171 A | 10/2018 |

OTHER PUBLICATIONS

Wang, Face R-CNN, Jun. 2017, arXiv (Year: 2017).*
Yang, Jianwei et al., "Learn Convolutional Neural Network for Face Anti-Spoofing", *arXiv preprint arXiv:1408.5601*, Aug. 26, 2014 (8 pages in English).
Partial European Search Report dated May 17, 2019 in counterpart European Patent Application No. 18215416.1 (13 pages in English).
Lee, Ping-Hsien et al., "On Automatic Collection of Multiangle Face Prototypes", *IEEE Transactions on Systems, Man, and Cybernetics—Part A: Systems and Humans*, vol. 36, Issue 6, Nov. 2006 (pp. 2146-2151).
Kollreider, K. et al., "Verifying Liveness by Multiple Experts in Face Biometrics", 2008 IEEE Computer Society Conference on Computer Vision and Pattern Recognition Workshops, 2008 (pp. 1-6).
Li, Lei et al., "An Original Face Anti-spoofing Approach using Partial Convolutional Neural Network", *2016 Sixth International Conference on Image Processing Theory, Tools and Applications (IPTA)*, 2016 (pp. 1-6).
Extended European Search Report dated Dec. 19, 2019 in counterpart European Patent Application No. 18215416.1 (16 pages in English).

\* cited by examiner

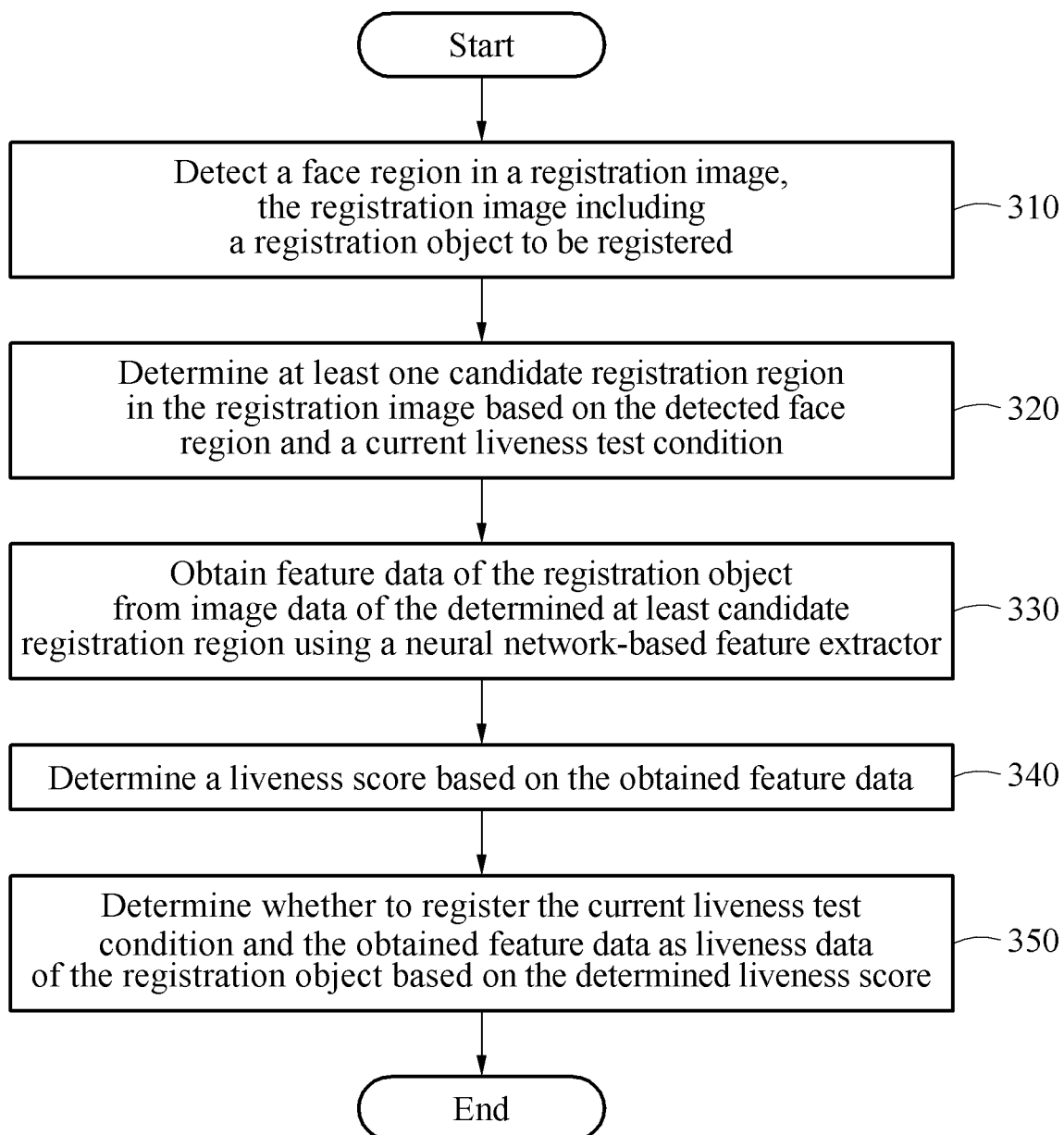

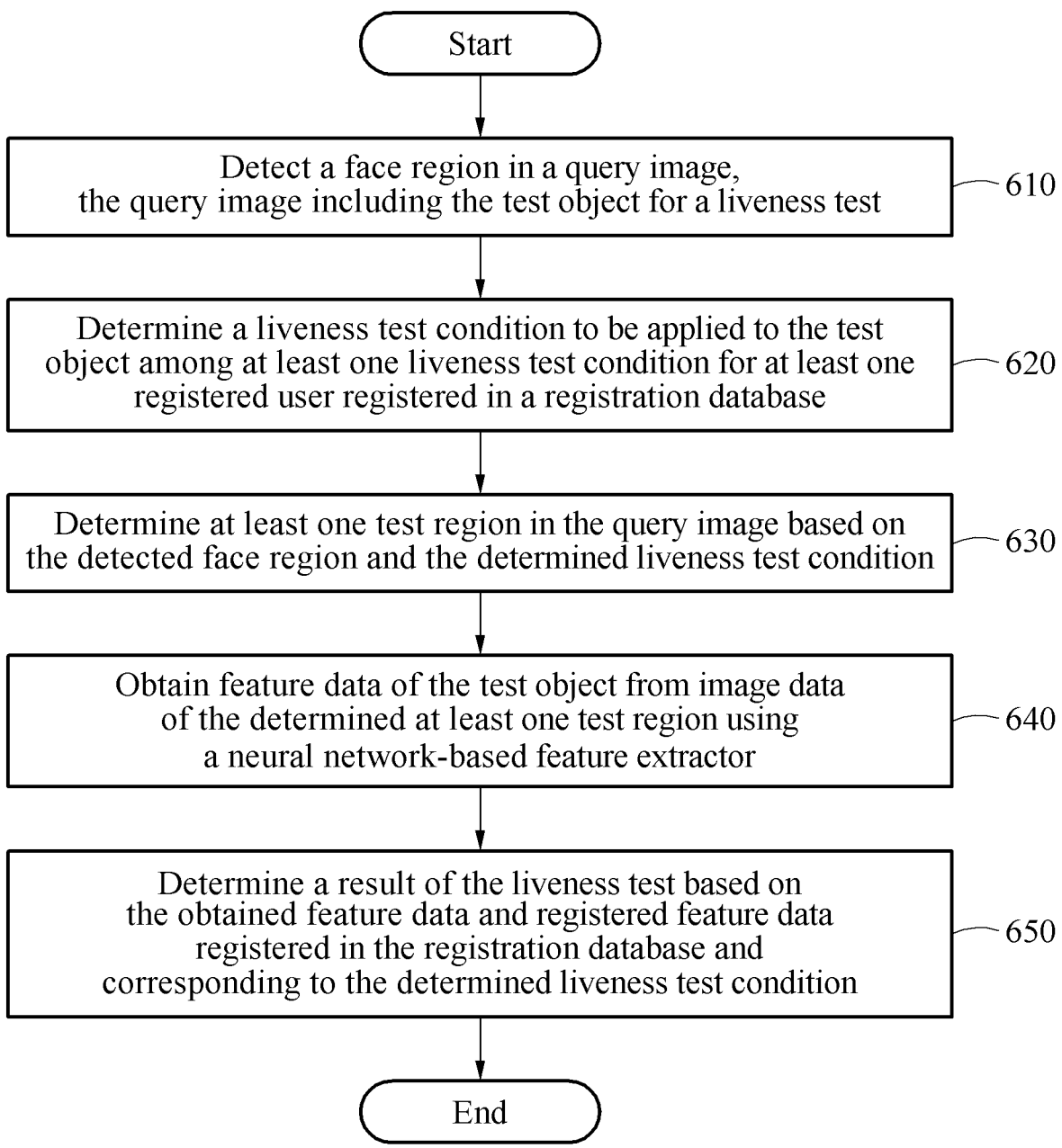

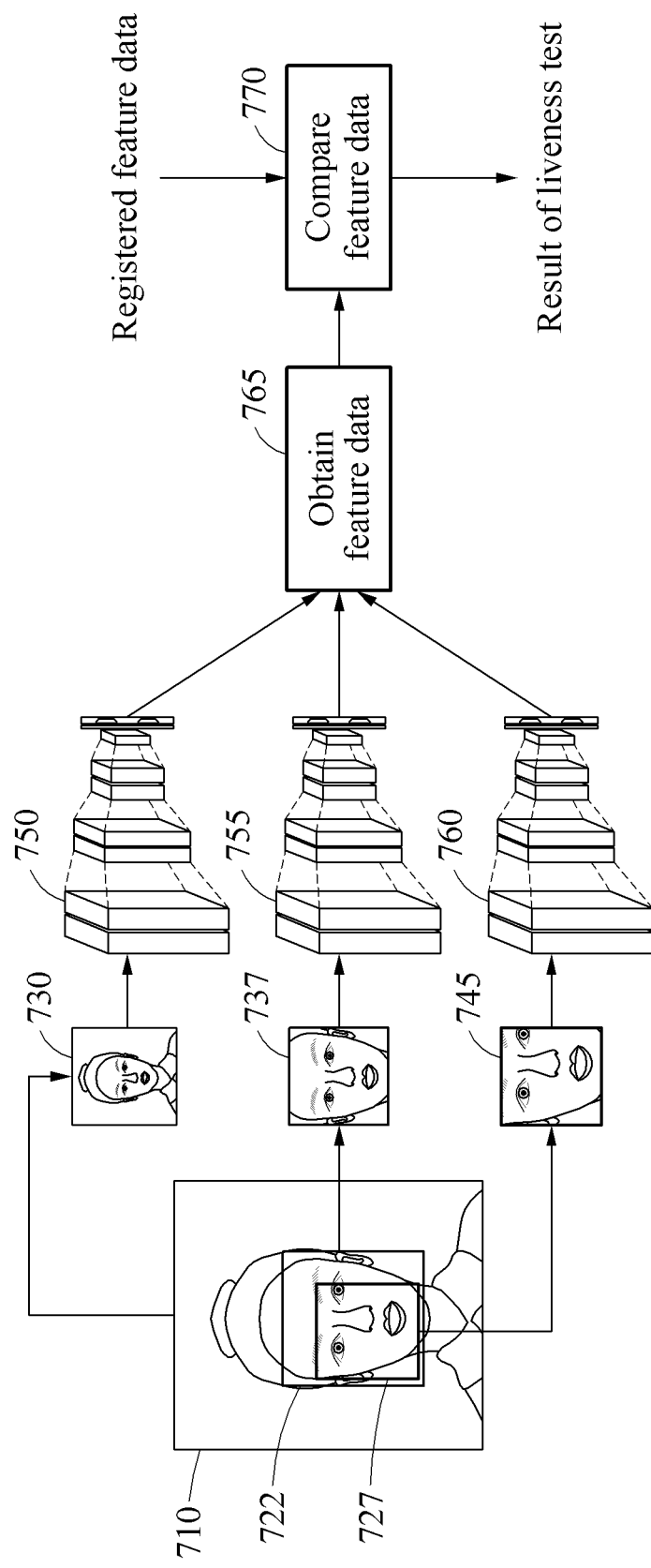

LIVENESS TEST METHOD AND APPARATUS

CROSS-REFERENCE TO RELATED APPLICATIONS

This application claims the benefit under 35 USC 119(a) of Korean Patent Application No. 10-2017-0177240 filed on Dec. 21, 2017, in the Korean Intellectual Property Office, the entire disclosure of which is incorporated herein by reference for all purposes.

BACKGROUND

1. Field

The following description relates to technology for detecting liveness of an object in an image, and technology for registering liveness data intrinsic to the object.

2. Description of Related Art

In a user verification system, a computing apparatus determines whether to allow a user to access the computing apparatus based on verification information provided by the user. The verification information may include, for example, either one or both of a password input by the user and biometric information of the user. The biometric information may include, for example, information associated with any one or any combination of any two or more of a fingerprint, an iris, and a face of the user.

Recently, face anti-spoofing technology has been developed as a security method for a user verification system to combat a face spoofing attack, which is a type of spoofing attack using a representation of a user's face, such as an image, a video, or a mask. The face anti-spoofing technology is intended to identify a face spoofing attack, using, for example, biometric mimicking, during a facial verification process. The face anti-spoofing technology is used to determine whether a face of a user input to the computing apparatus is a fake face or a genuine face. The face anti-spoofing technology may include extracting features, such as, for example, local binary patterns, (LBP), a histogram of oriented gradients (HOG), and a difference of Gaussians (DoG), from an input image and determining whether an input face is fake or genuine based on the extracted features.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented liveness test method includes detecting a face region in a query image, the query image including a test object for a liveness test; determining a liveness test condition to be applied to the test object among at least one liveness test condition for at least one registered user registered in a registration database; determining at least one test region in the query image based on the detected face region and the determined liveness test condition; obtaining feature data of the test object from image data of the determined at least one test region using a neural network-based feature extractor; and determining a result of the liveness test based on the obtained feature data and registered feature data registered in the registration database and corresponding to the determined liveness test condition.

The liveness test condition may include either one of both of a size of a first test region and a location of a second test region.

The determining of the at least one test region may include determining either one or both of a first test region and a second test region based on the detected face region and the determined liveness test condition.

The determining of the either one or both of the first test region and the second test region may include determining, to be the first test region, one of a first region having a size larger than a size of the detected face region, a second region having a size equal to the size of the detected face region, and a third region having a size smaller than the size of the detected face region based on the determined liveness test condition.

The determining of the either one or both of the first test region and the second test region may include determining, to be the second test region, a partial face region having a location in the detected face region determined based on the determined liveness test condition.

The obtaining of the feature data of the test object may include obtaining the feature data of the test object based on the determined either one or both of the first test region and the second test region, and a third test region corresponding to an entire region of the query image.

The determining of the liveness test condition may include, in response to a single liveness test condition for a single registered user being registered in the registration database, determining the single liveness test condition for the single registered user to be the liveness test condition to be applied to the test object.

The determining of the liveness test condition may include, in response to a plurality of liveness test conditions for a plurality of registered users being registered in the registration database, performing user recognition on the test object to determine a registered user corresponding to the test object among the registered users; and determining, to be the liveness test condition to be applied to the test object, a liveness test condition for the registered user corresponding to the test object among the liveness test conditions.

The determining of the liveness test condition may include, in response to a plurality of liveness test conditions for a plurality of registered users being registered in the registration database, displaying identifiers respectively corresponding to the liveness test conditions; receiving data for selecting one of the displayed identifiers from a user input; and determining, to be the liveness test condition to be applied to the test object, a liveness test condition corresponding to one of the displayed identifiers selected based on the data received from the user input.

The at least one test region may include a plurality of test regions, and the obtaining of the feature data of the test object may include obtaining the feature data of the test object using separate feature extractors to which image data of the plurality of test regions are respectively input.

The at least one test region may include a plurality of test regions, and the obtaining of the feature data of the test object may include obtaining the feature data of the test object using a single feature extractor including separate input layers to which image data of the plurality of test regions are respectively input.

The determining of the result of the liveness test may include determining whether the test object is a live object based on a similarity between the obtained feature data and the registered feature data.

In another general aspect, a non-transitory computer-readable medium stores instructions that, when executed by a processor, cause the processor to perform the processor-implemented liveness test method described above.

In another general aspect, a processor-implemented liveness data registration method includes detecting a face region in a registration image, the registration image including a registration object to be registered; determining at least one candidate registration region in the registration image based on the detected face region and a current liveness test condition; obtaining feature data of the registration object from image data of the determined at least candidate registration region using a neural network-based feature extractor; determining a liveness score based on the obtained feature data; and determining whether to register the current liveness test condition and the obtained feature data as liveness data of the registration object based on the determined liveness score.

The determining of the at least one candidate registration region may include determining either one or both of a first candidate registration region and a second candidate registration region based on the detected face region and the current liveness test condition.

The determining of the at least one candidate registration region may include determining, to be the first candidate registration region, one of a first region having a size larger than a size of the detected face region, a second region having a size equal to the size of the detected face region, and a third region having a size smaller than the size of the detected face region based on the determined liveness test condition.

The determining of the at least one candidate registration region may include determining, to be the second candidate registration region, a partial face region having a location in the detected face region determined based on the current liveness test condition.

The obtaining of the feature data of the registration object may include obtaining the feature data of the registration object based on the determined either one or both of the first candidate registration region and the second candidate registration region, and a third candidate registration region corresponding to an entire region of the registration image.

The at least one candidate registration may include a plurality of candidate regions, and the obtaining of the feature data of the registration object may include obtaining the feature data of the registration object using separate feature extractors to which image data of the plurality of candidate registration regions are respectively input.

The determining of whether to register the current liveness test condition and the obtained feature data as liveness data of the registration object may include, in response to the determined liveness score being greater than at least one other liveness score determined for at least one other liveness test condition, determining to register the current liveness test condition and the obtained feature data as liveness data of the registration object.

In another general aspect, a liveness test apparatus for determining liveness of a test object for a liveness test includes a processor configured to detect a face region in a query image, the query image including the test object; determine a liveness test condition to be applied to the test object among at least one liveness test condition for at least one registered user registered in a registration database; determine at least one test region in the query image based on the detected face region and the determined liveness test condition; obtain feature data of the test object from image data of the determined at least one test region using a neural network-based feature extractor; and determine a result of the liveness test based on the obtained feature data and registered feature data registered in the registration database and corresponding to the determined liveness test condition.

The liveness test apparatus may further include a memory configured to store instructions executable by the processor; and the processor may be further configured to execute the instructions to configure the processor to detect the face region in the query image, the query image including the test object; determine the liveness test condition to be applied to the test object among the at least one liveness test condition for the at least one registered user registered in the registration database; determine the at least one test region in the query image based on the detected face region and the determined liveness test condition; obtain the feature data of the test object from the image data of the determined at least one test region using the neural network-based feature extractor; and determine the result of the liveness test based on the obtained feature data and the registered feature data registered in the registration database and corresponding to the determined liveness test condition.

The liveness test condition may include either one or both of a size of a first test region and a location of a second test region.

In another general aspect, a liveness data registration apparatus for registering liveness data of a registration object to be registered includes a processor configured to detect a face region in a registration image, the registration image including the registration object; determine at least one candidate registration region in the registration image based on the detected face region and a current liveness test condition; obtain feature data of the registration object from image data of the determined at least one candidate registration region using a neural network-based feature extractor; determine a liveness score based on the obtained feature data; and determine whether to register the current liveness test condition and the obtained feature data as liveness data of the registration object based on the determined liveness score.

The liveness data registration apparatus may further include a memory configured to store instructions executable by the processor; and the processor may be further configured to execute the instructions to configure the processor to detect the face region in the registration image, the registration image including the registration object; determine the at least one candidate registration region in the registration image based on the detected face region and the current liveness test condition; obtain the feature data of the registration object from the image data of the determined at least one candidate registration region using the neural network-based feature extractor; determine the liveness score based on the obtained feature data; and determine whether to register the current liveness test condition and the obtained feature data as the liveness data of the registration object based on the determined liveness score.

In another general aspect, a processor-implemented liveness test method includes obtaining a query image including a test object for a liveness test; obtaining feature data of the test object from image data of the query image based on a liveness test condition personalized for an individual user using a neural network-based feature extractor; and performing a liveness test on the test object based on the obtained feature data and feature data previously obtained for the individual user.

The liveness test condition may specify either one or both of a size of a first test region and a location of a second test region; and the obtaining of the feature data may include obtaining the feature data from either one or both of image data of a first test region of the query image having the size specified by the liveness test condition and image data of a second test region of the query image at the location specified by the liveness test condition using the neural network-based feature extractor.

The feature data previously obtained for the individual user may have been obtained under the liveness test condition personalized for the individual user.

The processor-implemented liveness test method may be performed in a computing apparatus configured to determine whether to allow access to the computing apparatus based on a result of the liveness test.

In another general aspect, a processor-implemented liveness data registration method includes obtaining a registration image including a registration object to be registered; obtaining feature data of the registration object from image data of the registration image based on a current liveness test condition using a neural network-based feature extractor; performing a liveness test on the registration object based on the obtained feature data; and determining whether to register the current liveness test condition and the obtained feature data as liveness data of the registration object based on a result of the liveness test.

The current liveness test condition may specify either one or both of a size of a first candidate registration region and a location of a second candidate registration region; and the obtaining of the feature data of the registration object may include obtaining the feature data from either one or both of image data of a first candidate registration region of the registration image having the size specified by the current liveness test condition and image data of a second candidate registration region of the registration image at the location specified by the liveness test condition using the neural network-based feature extractor.

The determining of whether to register the current liveness test condition and the obtained feature data as liveness data of the registration object may include determining a liveness test score based on the obtained feature data; and determining to register the current liveness test condition and the obtained feature data as liveness data of the registration object in response to the determined liveness score being greater than at least one other liveness score determined for at least one other liveness test condition.

The processor-implemented liveness data registration method may be performed in a computing apparatus configured to determine whether to allow access to the computing apparatus based on liveness data registered for a registration object.

Other features and aspects will be apparent from the following detailed description, the drawings, and the claims.

BRIEF DESCRIPTION OF THE DRAWINGS

FIG. 3 is a flowchart illustrating an example of a liveness data registration method.

FIG. 6 is a flowchart illustrating an example of a liveness test method.

FIGS. 7A and 7B are diagrams illustrating examples of a liveness test method.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
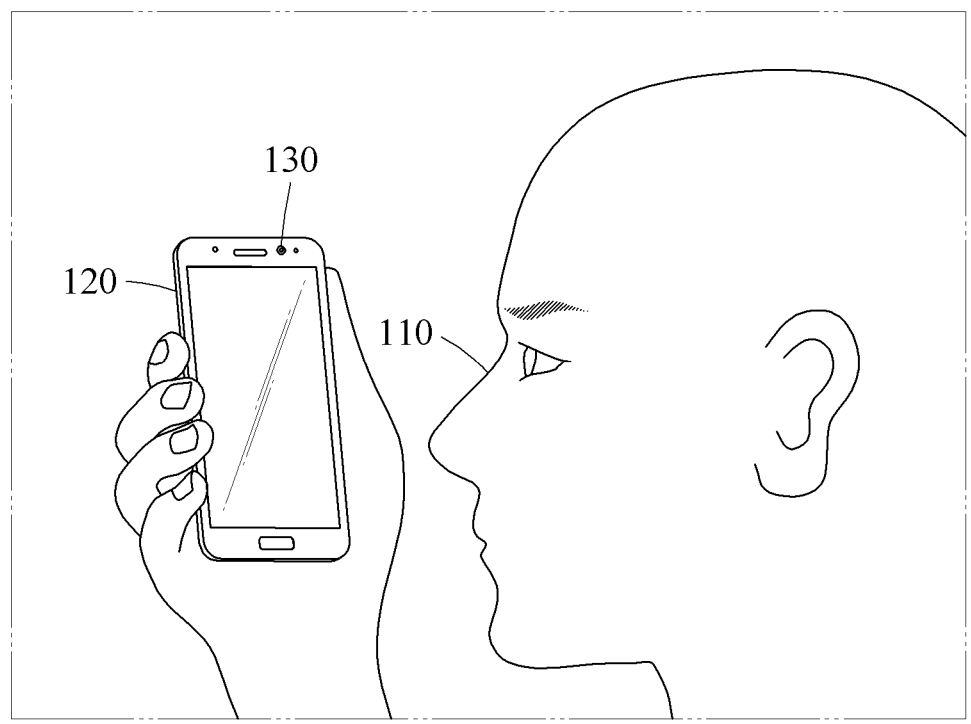
FIG. 1 is a diagram illustrating an example of a liveness test.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only, and is not to be used to limit the disclosure. The articles "a," "an," and "the" are intended to include the plural forms as well, unless the context clearly indicates otherwise. The term "and/or" includes any one and any combination of any two or more of the associated listed items. The terms "include," "comprise," and "have" specify the presence of stated features, numbers, operations, elements, components, and/or combinations thereof, but do not preclude the presence or addition of one or more other features, numbers, operations, elements, components, and/or combinations thereof.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, similar expressions, for example, "between" and "immediately between," and "adjacent to" and "immediately adjacent to," are also to be construed in the same way.

Unless otherwise defined, all terms, including technical and scientific terms, used herein have the same meaning as commonly understood by one of ordinary skill in the art to which the disclosure of this application pertains based on an understanding of the disclosure of this application. Terms, such as those defined in commonly used dictionaries, are to be interpreted as having a meaning that is consistent with their meaning in the context of the relevant art and the disclosure of this application, and are not to be interpreted in an idealized or overly formal sense unless expressly so defined herein.

FIG. 1 is a diagram illustrating an example of a liveness test.

A liveness test may be performed to determine whether a test object that is a target for the liveness test is live or not. For example, the liveness test may be performed to determine whether a face in an image captured by a camera is a genuine face or a fake face. In one example, the liveness test may be used to determine liveness of a verification target for a user verification performed for user log-in, payment services, access control, and other operations requiring user verification. In this example, the verification target is the test object described in the foregoing. For example, in a user verification system, the liveness test may be used to distinguish between a lifeless object, for example, a photograph, an image, a replica or other representation of a user used in a face spoofing attack, and a live object, for example, a live human being.

An invalid user may use a spoofing technique to obtain a false acceptance in such a user verification system. For example, the invalid user may present, to a camera, a color image, a video, a mask, a replica, or other representation in which a face of a valid user appears to obtain a false acceptance in facial verification. The liveness test filters out or blocks such an attempt for the facial verification, for example, a face spoofing attack performed using a substitute for a face of the valid user, for example, an image, a video, a mask, a replica, or other representation of the face of the valid user. In response to a determination that the verification target is a lifeless object as a result of the liveness test, the user verification is not performed, or the user verification is determined to finally fail irrespective of a result of the user verification.

Referring to FIG. 1, a liveness test apparatus configured to perform such a liveness test is included in, or represented by, a computing apparatus 120. The computing apparatus 120 may be, for example, a smartphone, a wearable device, a tablet computer, a netbook, a laptop computer, a desktop computer, a personal digital assistant (PDA), a set-top box, a home appliance, a biometric door lock, a security device, or a vehicle start device.

In the example illustrated in FIG. 1, a user 110 is attempting user verification through facial verification to gain access to the computing apparatus 120. For example, in a case in which the user 110 attempts the facial verification to cancel a lock state of the computing apparatus 120, the computing apparatus 120 obtains a face image of the user 110 using a camera 130, analyzes the obtained face image, and determines whether to cancel the lock state of the computing apparatus 120 based on a result of the analysis. In this example, when the user verification is successful, the computing apparatus 120 cancels the lock state and allows the user 110 to access the computing apparatus 120. Conversely, when the user verification is unsuccessful, the computing apparatus 120 continues to operate in the lock state. In another example, when the user 110 attempts the facial verification in the computing apparatus 120 to operate a payment service in the computing apparatus 120, the computing apparatus 120 obtains the face image of the user 110 and analyzes the obtained face image. In this example, when the user 110 is recognized as a valid user as a result of the analysis of the face image, the computing apparatus 120 approves a payment request, or refuses the payment request when the user 110 is not recognized as a valid user as a result of the analysis of the face image.

In one example, in such a user verification, a liveness test is performed to determine whether an object of the user verification is a live object or not by the liveness test apparatus before a result of the user verification is determined. In this example, in response to a determination that the object of the user verification is a live object as a result of the liveness test, the computing apparatus 120 determines whether the user verification is successful or not. Conversely, in response to a determination that the object of the user verification is a lifeless object, the computing apparatus 120 continues to operate in a lock state or refuses a payment request without performing an operation of determining whether the user verification is successful or not.

Alternatively, when a result of the liveness test is determined to be unsuccessful although a result of the user verification is successful, or when a verification object is determined to be a lifeless object, in a case in which the user verification is performed before the liveness test, a final result of the user verification is determined to be unsuccessful.

In such a liveness test, the liveness test apparatus performs a liveness test based on a liveness feature of an individual user that is registered in advance. The liveness test apparatus does not perform the same liveness test on all users, but performs a liveness test personalized based on a characteristic or a feature of an individual user based on a liveness feature intrinsic to an individual user that is stored in a registration process. Thus, an accuracy of a result of the liveness test increases, and an accuracy deviation in results of liveness tests on users is reduced.

In addition, the liveness test apparatus performs the liveness test on the test object comprehensively based on various factors in an image captured by the camera 130. For example, the liveness test apparatus determines whether the test object is a live object based on context information of an entire region of the captured image, shape information of an entire face region in the captured image, and texture information of a partial face region in the captured image. An image that is captured when the test object is far away from the camera 130 may include a clue as to whether the test object is a screen of an electronic device or a paper. For example, a hand of a user holding the electronic device or the paper may appear in the image, which may be used as a clue based on which the test object is determined to be fake. Such a spoofing attempt may be effectively detected based on the context information. In addition, light reflection and shape distortion may also be used to determine a result of the liveness test based on the shape information of the entire face region. For example, light reflection in a photograph or a paper, which are examples of representations used for face spoofing, is used to distinguish the photograph or paper from a genuine human face, and a shape distortion may occur due to warping or wrinkling of the photograph or the paper. The liveness test is performed based on such factors. Also, a subtle texture difference between human skin and a paper or a screen of an electronic device may be determined based on the texture information.

As described above, the liveness test apparatus performs a liveness test more accurately by comprehensively considering various liveness determination or test factors based on a robust feature that is different for each user. Hereinafter, how liveness data intrinsic to an individual user is registered and how a liveness test is performed based on the registered liveness data will be described in detail.

Figure 2:
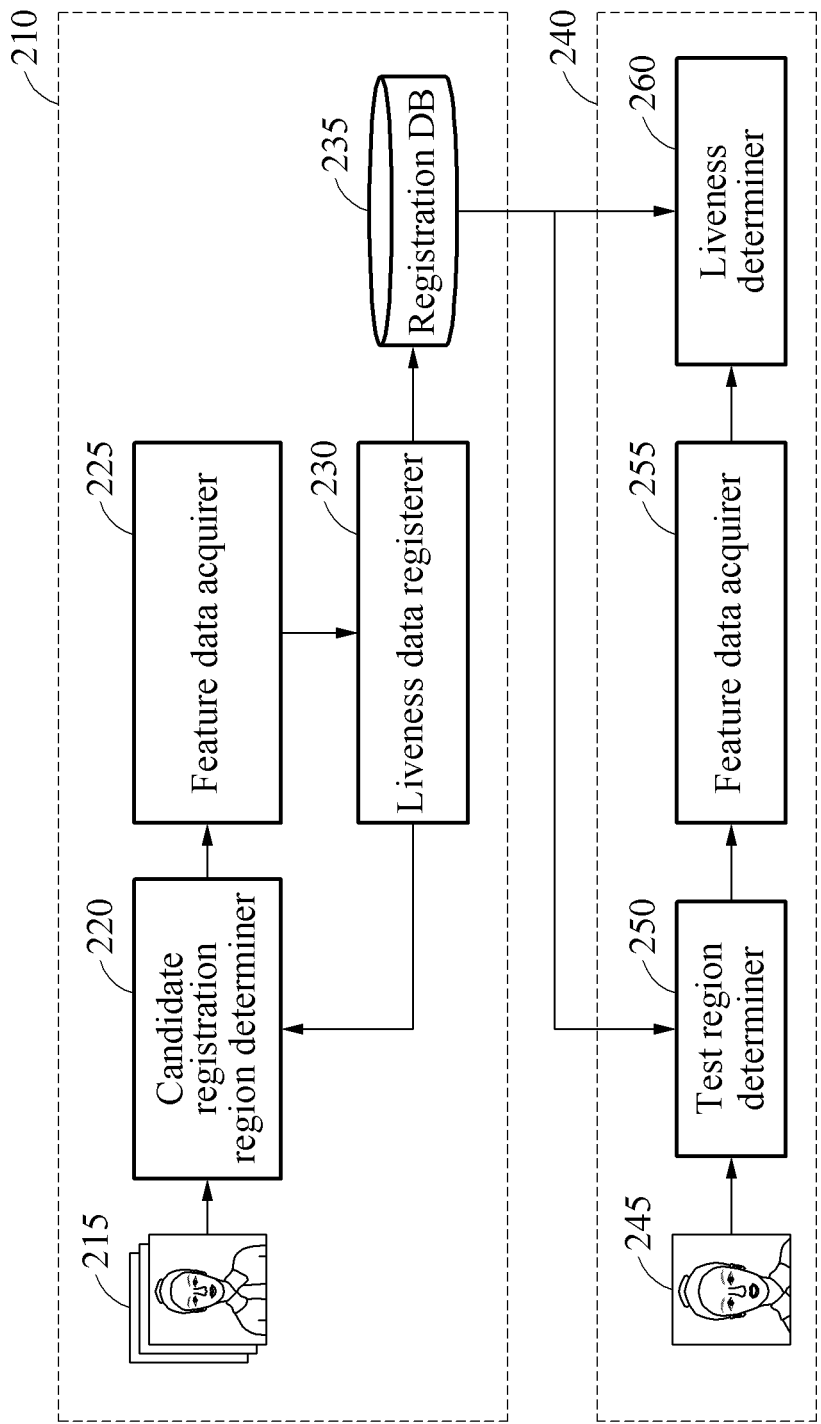
FIG. 2 is a diagram illustrating an example of an overall process of a liveness data registration and a liveness test.

FIG. 2 is a diagram illustrating an example of an overall process of a liveness data registration and a liveness test.

Referring to FIG. 2, liveness data of a valid user is registered in a liveness data registration process 210. The registration process 210 is performed along with a process in which the user registers a face of the user in a computing apparatus for user registration. In the registration process 210, individual user liveness data that is optimized for determining whether there is an attempt to spoof a face of a user is registered. The liveness data includes a feature vector and metadata defining a liveness test condition that maximizes a liveness score. The metadata includes, for example, a size of an entire face region and a location of a partial face region that maximize a liveness score and are to be used to determine liveness.

The registration process 210 is performed by a liveness data registration apparatus including a candidate registration region determiner 220, a feature data acquirer 225, and a liveness data registerer 230, which may be implemented by one or more processors of the liveness data registration apparatus. The candidate registration region determiner 220 determines at least one candidate region from which a feature is extracted in a registration image 215 including a registration object of liveness data. For example, the candidate registration region determiner 220 determines a first candidate registration region corresponding to an entire face region in the registration image 215, a second candidate registration region corresponding to a partial face region in the registration image 215, and a third candidate registration region corresponding to an entire region of the registration image 215. In this example, the first candidate registration region and the second candidate registration region are determined differently each time a candidate registration region is determined. For example, each time a candidate registration region is determined, a size of the first candidate registration region and a location at which the second candidate registration region is set change.

The feature data acquirer 225 obtains feature data of the registration object based on the at least one candidate registration region. The feature data is data representing a feature associated with liveness of the registration object, and may be a feature value or a probability value indicating a probability of the registration object being a live object.

The feature data acquirer 225 obtains the feature data from each candidate registration region using a neural network-based feature extractor. The feature extractor outputs a result value calculated by internal parameters based on input data. The feature extractor includes a plurality of layers each including nodes. The feature extractor includes, for example, an input layer, at least one hidden layer, and an output layer. Depending on a structure of a neural network, nodes included in neighboring layers are selectively connected to each other based on connection weights between the nodes. Data input to the feature extractor is processed or changed while passing through the input layer and the at least one hidden layer, and is finally converted to a certain result value by the output layer.

In one example, the feature extractor is based on a deep convolutional neural network (DCNN) including a plurality of hidden layers. The DCNN includes a convolution layer, a pooling layer, and a fully connected layer, and obtains information to be used to determine liveness from image data input to the feature extractor from an operation or computation performed by each layer. The image data is a pixel value of each of pixels included in an image, for example, a color value and a brightness value. However, the DCNN is merely one example of a neural network structure, and the feature extractor may operate based on a neural network of other structures different from the DCNN.

The internal parameters of the feature extractor, for example, connection weights between nodes, are determined in advance by training the feature extractor. For example, in a training process, there are a great number of sets of training data and a desired value corresponding to each set of training data. When training data is input to the feature extractor, the internal parameters of the feature extractor are adjusted so that the feature extractor outputs a desired value corresponding to the input training data. For example, a loss based on a difference between a result value output from the feature extractor and a desired value is calculated, and the internal parameters of the feature extractor are adjusted to reduce the loss. By repeating such a process on each set of training data, the internal parameters are adjusted so that an output value corresponding to the desired value is output from the feature extractor.

The liveness data registerer 230 determines a liveness score based on the feature data obtained by the feature data acquirer 225. For example, in a case in which a probability value indicating whether a verification object is a live object with respect to each of candidate registration regions is obtained as the feature data, the liveness data registerer 230 determines the liveness score based on a weighted sum of the probability values respectively corresponding to the candidate registration regions. However, a method of determining a liveness score is not limited to the example described in the foregoing. For example, a sum or a mean of the probability values corresponding to the candidate registration regions may also be determined to be the liveness score.

After a liveness score is determined for one liveness test condition, the candidate registration region determiner 220 determines another at least one candidate registration region in the registration image 215 based on another liveness test condition. For example, the candidate registration region determiner 220 determines a first candidate registration region and a second candidate registration region in which the size of the entire face region and the location of the partial face region are different from those in the previous liveness test condition. Subsequently, the feature data acquirer 225 obtains feature data from the newly determined first candidate registration region, the newly determined second candidate registration region, and the third candidate registration region corresponding to the entire region of the registration image 215, and the liveness data registerer 230 determines a liveness score based on the new liveness test condition.

As described above, the liveness data registration apparatus performs the process described in the foregoing for each of predefined liveness test conditions, and the liveness data registerer 230 determines a liveness score based on each of the liveness test conditions. In one example, the registration image 215 includes a plurality of image frames. In such an example, for each of the image frames, a series of operations including determining at least one candidate registration region, obtaining feature data, and determining a liveness score are repetitively performed for each liveness test condition.

The liveness data registerer 230 selects a liveness test condition having a greatest liveness score among the liveness scores respectively corresponding to the liveness test conditions, and stores liveness data associated with the selected liveness test condition in a registration database (DB) 235. A greatest liveness score corresponding to a certain liveness test condition indicates that when a candidate registration region is determined based on the liveness test condition, a feature to be used to determine liveness is most desirably extracted. In the registration DB 235, feature data extracted under the liveness test condition, or registered feature data, and data defining the liveness test condition, for example, a size of an entire face region and a location of a partial face region, are stored as liveness data.

In the registration DB 235, liveness data of a plurality of users is stored. The liveness data is stored in association with an identifier to identify a registered user. Thus, the liveness data of the plural users is registered separately for each of the users. For example, when an identifier of a user is selected in a liveness test, registered liveness data of the user is extracted from the registration DB 235 based on the selected identifier of the user. Hereinafter, how to register liveness data will be described in detail with reference to FIGS. 3 through 5B.

Referring again to FIG. 2, in a liveness test process 240, a liveness test is performed on a query image 245 based on the liveness data registered in the registration process 210. By performing the liveness test, whether a verification object attempting a biometric verification is a fake object or a genuine object is determined. A query image is an image including a test object that is a target for a liveness test, or an image captured by a camera or received from an interface for user verification. The query image may also be referred to as an input image or a verification image.

The liveness test process 240 is performed by a liveness test apparatus including a test region determiner 250, a feature data acquirer 255, and a liveness determiner 260, which may be implemented by one or more processors of the liveness test apparatus. The test region determiner 250 determines a liveness test condition to be applied to the test object based on the liveness data registered in the registration DB 235. For example, in a case in which liveness data of a plurality of users is registered in the registration DB 235, the liveness test condition to be applied to the test object is determined based on liveness data of a user corresponding to the test object. The user corresponding to the test object is determined based on a result of user identification or a user input received from an interface.

The test region determiner 250 determines at least one test region in the query image 245 based on the determined liveness test condition. For example, the test region determiner 250 determines a first test region corresponding to an entire face region of the query image 245, a second test region corresponding to a partial face region of the query image 245, and a third test region corresponding to an entire region of the query image 245. A size of the first test region and a location of the second test region are determined based on the liveness test condition to be applied.

The feature data acquirer 255 obtains feature data of the test object based on the test region. The feature data acquirer 255 obtains the feature data using feature extractor that is the same as the feature extractor used by the feature data acquirer 225 in the registration process 210. The feature extractor receives, as an input, image data of the test region, and outputs the feature data corresponding to the input image data.

The liveness determiner 260 compares the feature data obtained by the feature data acquirer 255 with the feature data registered in the registration DB 235, and determines a result of the liveness test based on a result of the comparing. The registered feature data is feature data corresponding to a registered liveness test condition used to determine the test region. For example, in response to a similarity between the obtained feature data and the registered feature data being greater than a threshold value, the test object is determined to be a live object. Conversely, in response to the similarity between the obtained feature data and the registered feature data being less than or equal to the threshold value, the test object is determined to be a lifeless object. Hereinafter, how to perform a liveness test will be described in detail with reference to FIGS. 6 through 7B.

As described above, by registering a liveness feature that is intrinsic to a user and performing a liveness test based on the registered liveness feature, an accuracy of the liveness test is enhanced.

FIG. 3 is a flowchart illustrating an example of a liveness data registration method. The liveness data registration method is performed by a liveness data registration apparatus.

Referring to FIG. 3, in operation 310, the liveness data registration apparatus detects a face region in a registration image including a registration object to be registered. For example, the liveness data registration apparatus detects the face region in the registration image using a Haar-based cascade AdaBoost classifier or a Viola-Jones detector. However, these are merely examples, and the liveness data registration apparatus may detect a face region in an input image using any of various other face region detecting methods. For example, the liveness data registration apparatus may detect facial landmarks in a registration image and detect, as a face region, a bounding region including the detected facial landmarks. The registration image may be an image used in user verification, or an image captured by a camera to register liveness data.

In operation 320, the liveness data registration apparatus determines at least one candidate registration region in the registration image based on the detected face region and a current liveness test condition. The current liveness test condition includes, for example, a size of an entire face region based on the detected face region and a location of a partial face region that is smaller than the detected face region. In one example, the liveness data registration apparatus determines either one or both of a first candidate registration region and a second candidate registration region based on the detected face region and the current liveness test condition. For example, the liveness data registration apparatus determines, to be the first candidate registration region, one of a first region having a size larger than a size of the detected face region, a second region having a size equal to the size of the detected face region, and a third region having a size smaller than the size of the detected face region. The size of the first region and the size of the third region are determined in advance based on a liveness test condition. In addition, the liveness data registration apparatus determines, to be the second candidate registration region, a partial face region having a location in the detected face region determined based on the current liveness test condition. The liveness data registration apparatus determines, to be the second candidate registration region, a partial face region located at a top left, a top center, a top right, a middle left, a middle center, a middle right, a bottom left, a bottom center, or a bottom right of the face region based on the current liveness test condition. However, these are merely examples of possible locations of the partial face region, and different locations, a smaller number of locations, or a greater number of locations may be used. Furthermore, a partial face region at a particular location may overlap a partial face region at one or more other locations. For example, a partial face region at the top left of the face region may overlap partial face regions at the top center, the middle left, and the middle center of the face region. However, these are merely examples of ways in which the partial face regions can overlap, and they may overlap in other ways. In addition, the liveness data registration apparatus additionally determines a third candidate registration region corresponding to an entire region of the registration image.

In operation 330, the liveness data registration apparatus obtains feature data of the registration object from image data of the determined at least one candidate registration region using a neural network-based feature extractor. In one example, the liveness data registration apparatus obtains the feature data of the registration object based on either one or both of the first candidate registration region and the second candidate registration region, and the third candidate registration region. In one example, the liveness data registration apparatus obtains the feature data of the registration object using separate feature extractors to which image data of candidate registration regions are respectively input. In another example, a single feature extractor having separate input layers that respectively receive, as inputs, the image data of the candidate registration regions and a single output layer that outputs the feature data may also be used. The feature extractor described in the foregoing corresponds to the feature extractor described above with reference to FIG. 2.

In operation 340, the liveness data registration apparatus determines a liveness score based on the obtained feature data. In one example, the liveness data registration apparatus determines the liveness score to be a weighted sum of feature data corresponding to each of candidate registration regions. In another example, the liveness data registration apparatus calculates a numerical value indicating how close the registration object is to a live object from the feature data using a predefined equation, and determines the calculated numerical value to be the liveness score. Examples of a method of determining a liveness score are not limited to the example described in the foregoing, and various other methods may also be used to determine the liveness score.

In operation 350, the liveness data registration apparatus determines whether to register the current liveness test condition and the obtained feature data as liveness data of the registration object based on the determined liveness score.

The liveness data registration apparatus performs operations 310 through 340 for other liveness test conditions to determine a liveness score corresponding to each of the liveness test conditions. For example, in a case in which the liveness score corresponding to the current liveness test condition is greater than liveness scores corresponding to the other liveness test conditions, the liveness data registration apparatus determines to register the current liveness test condition and the feature data of the registration object obtained under the current liveness test condition. For example, in regard to the first candidate registration region described with reference to operation 320, in a case in which a liveness score determined when the entire face region has a certain size is greater than liveness scores determined when the entire face region has other sizes, the liveness data registration apparatus determines to register a corresponding liveness test condition specifying the certain size of the entire face region. In addition, in regard to the second candidate registration region, in a case in which a liveness score determined when the partial face region is at a certain location is greater than liveness scores determined when the partial face region is at other locations, the liveness data registration apparatus determines to register a corresponding liveness test condition specifying the certain location of the partial face region.

Figure 4A:
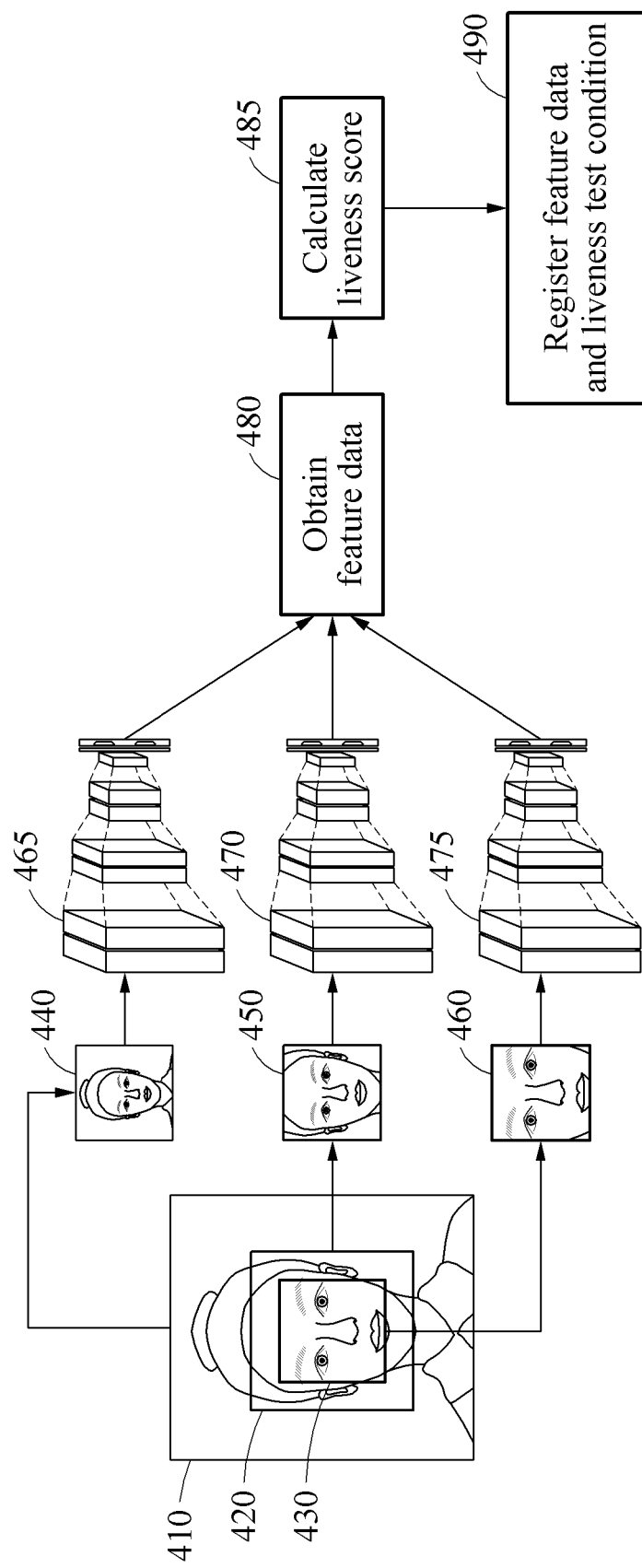
FIGS. 4A and 4B are diagrams illustrating an example of a liveness data registration method.
Figure 4B:
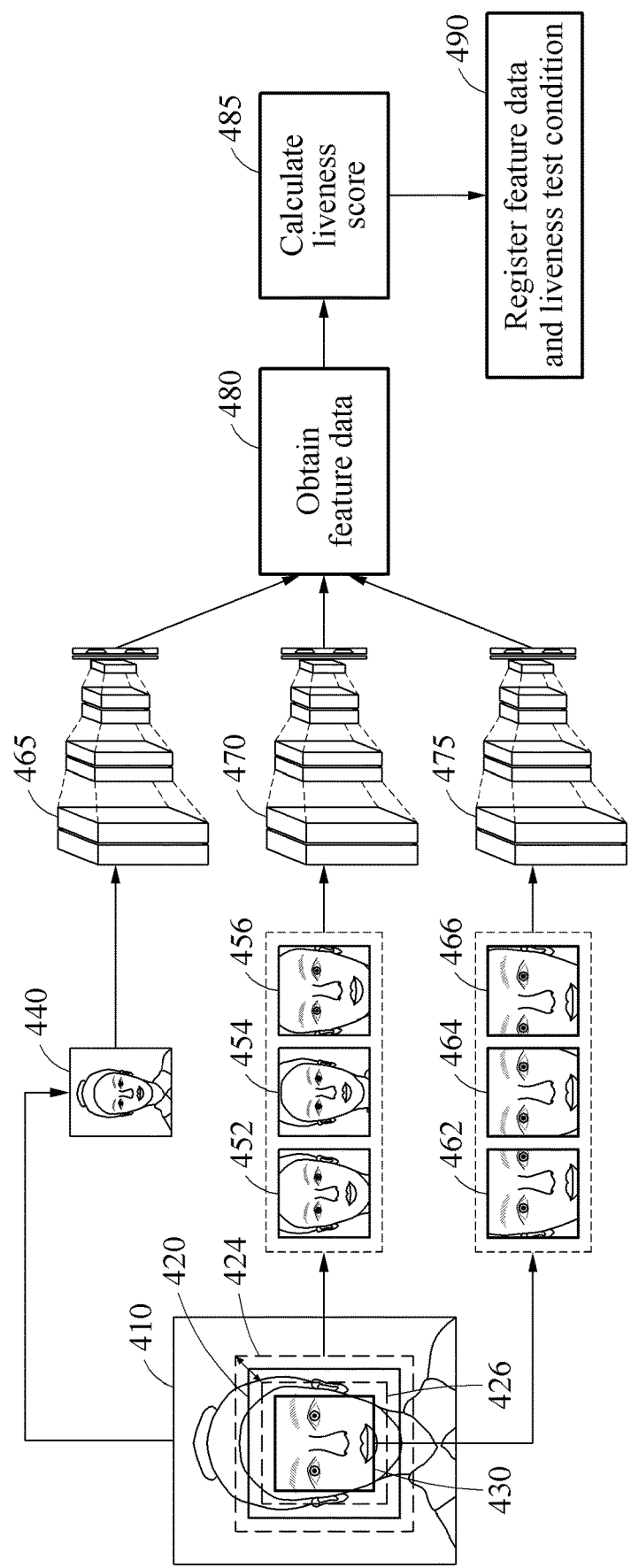

FIGS. 4A and 4B are diagrams illustrating an example of a liveness data registration method.

Referring to FIG. 4A, when a registration image is input to register liveness data, a face region 420 is detected in the input registration image. The face region 420 is detected by any of various face detecting methods using, for example, a Haar-based cascade AdaBoost classifier or a Viola-Jones detector. Subsequently, at least one candidate registration region is determined in the registration image based on a current liveness test condition. In the example illustrated in FIG. 4A, three candidate registration regions, that is, a first candidate registration region corresponding to an entire face region, a second candidate registration region 430 corresponding to a partial face region, and a third candidate registration region 410 corresponding to an entire region of the registration image are determined. In this example, it is assumed that the first candidate registration region is identical to the face region 420. Depending on an example, it is possible to determine one or two candidate registration regions. A size of the first candidate registration region and a location of the second candidate registration region 430 may change depending on a liveness test condition. That is, different liveness test conditions may specify different sizes of the first candidate registration region and different locations of the second candidate registration region.

Subsequently, image data of an image 450 corresponding to the first candidate registration region 420 is input to a first feature extractor 470, image data of an image 460 corresponding to the second candidate registration region 430 is input to a second feature extractor 475, and image data of an image 440 corresponding to the third candidate registration region 410 is input to a third feature extractor 465. Before the images 440, 450, and 460 are input to the feature extractors 465, 470, and 475, respectively, sizes of the images 440, 450, and 460 are adjusted so that the sizes are equal to each other, either by adjusting the sizes of all three of the images 440, 450, and 460 to be a predetermined size, or adjusting the sizes of two of the images 440, 450, and 460 to be equal to the size of a third one of the images 440, 450, and 460. The image data is a pixel value of a pixel in an image.

As illustrated, in operation 480, feature data, for example, a feature vector, corresponding to a registration object in the registration image, which is a target to be registered, is obtained from the feature extractors 465, 470, and 475. The first feature extractor 470 outputs first feature data corresponding to the image 450, the second feature extractor 475 outputs second feature data corresponding to the image 460, and the third feature extractor 465 outputs third feature data corresponding to the image 440.

In another example, the first feature data, the second feature data, and the third feature data are determined by a single feature extractor. For example, the image data of the images 440, 450, and 460 are input to separate input layers of the single feature extractor, and the first feature data, the second feature data, and the third feature data are output from a single output layer of the single feature extractor.

In operation 485, a liveness score is calculated based on the first feature data, the second feature data, and the third feature data. Subsequently, a series of operations of determining at least one candidate registration region in the registration image, obtaining feature data, and calculating a liveness score are performed as described above based on another liveness test condition that is not the current liveness test condition. In one example, the registration image includes a plurality of image frames, and the operations of determining at least one candidate registration region, obtaining feature data, and calculating a liveness score are performed for each of the image frames based on each liveness test condition. Thus, a liveness score is calculated for each of the image frames.

In operation 490, the feature data and the liveness test condition are registered based on the liveness scores obtained as described in the foregoing. A liveness test condition and an image frame having a greatest liveness score among the calculated liveness scores is selected, and first feature data, second feature data, and third feature data obtained in the selected liveness test condition and the selected image frame are stored as registered liveness data.

By performing the liveness data registration method described above, a liveness feature that is intrinsic to a registration object is extracted from a registration image including the registration object, and the extracted liveness feature is stored. The stored liveness feature is used to perform a liveness test on a test object.

FIG. 4B is a diagram illustrating a detailed example of the liveness data registration method described above with reference to FIG. 4A.

Referring to FIG. 4B, in a liveness data registration process, a series of operations of detecting the face region 420 the registration image and obtaining an optimal liveness test condition is performed. In one example, to determine optimal candidate registration regions to be used to determine feature data of the registration object, an operation of obtaining a size of the first candidate registration region and a location of the second candidate registration region 430 is performed. For example, as illustrated in FIG. 4B, the size of the first candidate registration region is determined to be one of a first region 424 having a size larger than a size of the face region 420, a second region having a size equal to the size of the face region 420, and a third region 426 having a size smaller than the size of the face region 420. In one example, the first region 424 has a size that is 110% of the size of the face region 420, and the third region 426 has a size that is 90% of the size of the face region 420. The first region 424, the second region, and the third region 426 correspond to different liveness test conditions. In one example, first feature data is obtained from the first feature extractor 470 based on image data of an image 454 corresponding to the first region 424, and a liveness score is calculated based on the first feature data. This process is repeated to obtain first feature data and calculate a liveness score for image data of an image 452 corresponding to the second region, and is repeated again to obtain first feature data and calculate a liveness score for image data of an image 456 corresponding to the third region 426.

In addition, in a case of the second candidate registration region 430 corresponding to the partial face region, a location thereof changes based on a liveness test condition. The second candidate registration region 430 is set at a location or a preset location in the face region 420 each time a liveness score is calculated. For example, the second candidate registration region 430 is determined to be located at one location, for example, at a middle left, a middle center, or a middle right of the face region 420 based on a liveness test condition. However, these are merely examples of possible locations of the second candidate registration region 430, and different locations, a smaller number of locations, or a greater number of locations may be used. Furthermore, a second candidate registration region 430 at a particular location may overlap a second candidate registration region 430 at one or more other locations. For example, a second candidate registration region 430 at the top left of the face region 420 may overlap second candidate registration regions 430 at the top center, the middle left, and the middle center of the face region 420. However, these are merely examples of ways in which the second candidate registration regions 430 can overlap, and they may overlap in other ways. Partial face images 462, 464, and 466 corresponding to the example locations correspond to different liveness test conditions. In one example, second feature data is obtained from the second feature extractor 475 based on image data of the partial face image 462, and a liveness score is calculated based on the second feature data. This process is repeated to obtain second feature data and calculate a liveness score for image data of the partial face image 464, and is repeated again to obtain second feature data and calculate a liveness score for image data of the partial face image 466.

The image 440 corresponding to the third candidate registration region 410 is input to the third feature extractor 465 irrespective of a liveness test condition, and third feature data is obtained by the third feature extractor 465. The third feature data is used along with the first feature data and the second feature data that are based on a liveness test condition to calculate a liveness score.

Figure 5A:
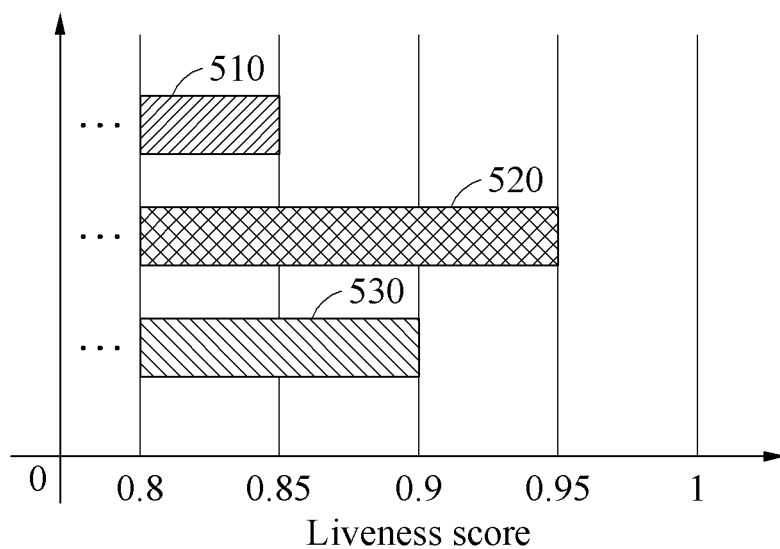
FIGS. 5A and 5B are diagrams illustrating examples of histograms of liveness scores obtained for different liveness test conditions described with reference to FIG. 4B.
Figure 5B:
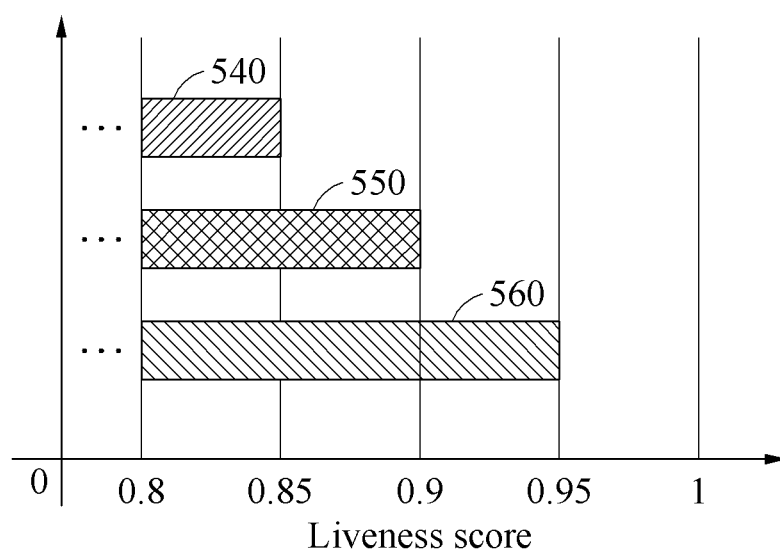

FIGS. 5A and 5B illustrate examples of histograms of liveness scores obtained for different liveness test conditions described with reference to FIG. 4B.

FIG. 5A illustrates an example of a histogram of liveness scores obtained for liveness test conditions associated with a size of the first candidate registration region corresponding to the entire face region. In the histogram, a liveness score 510 obtained when a size of the first candidate registration region corresponds to the third region 426 is determined to be 0.85, a liveness score 520 obtained when the size of the first candidate registration region corresponds to the first region 424 is determined to be 0.95, and a liveness score 530 obtained when the size of the first candidate registration region corresponds to the second region corresponding to the face region 420 is determined to be 0.9. In the example illustrated in FIG. 5A, a liveness test condition corresponding to a greatest liveness score, that is, the liveness score 520 obtained when the size of the first candidate registration region is the first region 424, is registered. In this example, in a liveness test process, a size of a first test region corresponding to an entire face region is set to be a region larger than a face region detected in a query image.

FIG. 5B illustrates an example of a histogram of liveness scores obtained for different liveness test conditions associated with a location of the second candidate registration region corresponding to the partial face region. In the histogram, a liveness score 540 obtained when the location of the second candidate registration region is a first location corresponding to the partial face image 462 is determined to be 0.85, a liveness score 550 obtained when the location of the second candidate registration region is a second location corresponding to the partial face image 464 is determined to be 0.9, and a liveness score 560 obtained when the location of the second candidate registration region is a third location corresponding to the partial face image 466 is determined to be 0.95. Similarly to the example illustrated in FIG. 5A above, a liveness test condition corresponding to a greatest liveness score, that is, the liveness score 560 obtained when the location of the second candidate registration region is the third location, is registered. In this example, in a liveness test process, a location of a second test region corresponding to a partial face region in a query image is set to be the third location.

FIG. 6 is a flowchart illustrating an example of a liveness test method. The liveness test method is performed by a liveness test apparatus.

Referring to FIG. 6, in operation 610, the liveness test apparatus detects a face region in a query image including a test object for a liveness test. The liveness test apparatus detects the face region using, for example, a Haar-based cascade AdaBoost classifier or a Viola-Jones detector.

In operation 620, the liveness test apparatus determines a liveness test condition to be applied to the test object among at least one liveness test condition for at least one registered user registered in a registration DB. A liveness test condition specifies, for example, a size of a first test region as illustrated in FIGS. 4A, 4B, and 5A and a location of a second test region as illustrated in FIGS. 4A, 4B, and 5B for use in determining at least one test region in the query image.

In one example, in a case in which a single liveness test condition for a single registered user is registered in the registration DB, the liveness test apparatus determines or selects the single liveness test condition for the single registered user to be the liveness test condition to be applied to the test object. However, in a case in which a plurality of liveness test conditions for a plurality of registered users are registered in the registration DB, the liveness test apparatus determines, to be the liveness test condition to be applied to the test object, a liveness test condition for a registered user corresponding to the test object among the registered users. The registered user corresponding to the test object is determined based on, for example, a result of user recognition performed on the test object. For example, a registered user determined to be closest to the test object among the registered users is determined to be the registered user corresponding to the test object. In another example, the liveness test apparatus displays identifiers respectively corresponding to the liveness test conditions, and receives data for selecting one of the displayed identifiers from a user input. The liveness test apparatus determines, to be the liveness test condition to be applied to the test object, a liveness test condition corresponding to the identifier selected based on the data received from the user input.

In operation 630, the liveness test apparatus determines at least one test region in the query image based on the face region detected in operation 610 and the liveness test condition determined in operation 620. A number of test regions to be determined in operation 630 is equal to a number of candidate registration regions used in a process of registering a liveness test condition.

In one example, the liveness test apparatus determines a first test region corresponding to an entire face region, a second test region corresponding to a partial face region, and a third test region corresponding to an entire region of the query image based on the liveness test condition. In this example, a size of the first test region and a location of the second test region are determined based on the liveness test condition. For example, the liveness test apparatus determines, to be the first test region, one of a first region having a size larger than a size of the face region detected in operation 610, a second region having a size equal to the size of the face region, and a third region having a size smaller than the size of the face region. In a case in which liveness data is registered based on a first candidate registration region being the third region in FIG. 4B having a size smaller than the size of the face region in a liveness data registration process, the first test region corresponding to the third region having a size smaller than the size of the face region is determined in a liveness test process. In addition, the liveness test apparatus determines, to be the second test region, a partial face region having a location in the face region detected in operation 610 determined based on the liveness test condition. For example, the liveness test apparatus determines a location of the second test region in the face region, for example, at a top left, a top center, a top right, a middle left, a middle center, a middle right, a bottom left, a bottom center, or a bottom right of the face region. However, these are merely examples of possible locations of the second test region, and different locations, a smaller number of locations, or a greater number of locations may be used. Furthermore, a second test region at a particular location may overlap a second test region at one or more other locations. For example, a second test region at the top left of the face region may overlap second test regions at the top center, the middle left, and the middle center of the face region. However, these are merely examples of ways in which the second test regions can overlap, and they may overlap in other ways. For example, in a case in which, in the liveness data registration process, liveness data is registered based on a second candidate registration region located at a middle center of the face region, the second test region corresponding to the partial face region is determined to be located at a middle center of the face region in the liveness test process.

In operation 640, the liveness test apparatus obtains feature data of the test object from image data of the determined at least one test region using a neural network-based feature extractor. In one example, the liveness test apparatus obtains the feature data of the test object based on either one or both of the first test region and the second test region, and the third test region corresponding to the entire region of the query image. The feature extractor used to obtain the feature data is the same as the feature extractor used in the liveness data registration process. In one example, the feature data of the test object is obtained using separate feature extractors to which image data of the test regions are respectively input. In another example, the feature data of the test object is obtained from a single feature extractor to which the image data of the test regions are respectively input through separate input layers of the single feature extractor, and the feature data is obtained from a single output layer of the single feature extractor.

In operation 650, the liveness test apparatus determines a result of the liveness test based on the feature data obtained in operation 640 and registered feature data corresponding to the determined liveness test condition. For example, the liveness test apparatus calculates a similarity between the feature data obtained from the feature extractor and the registered feature data, and determines whether the test object is a live object or not based on the calculated similarity. In response to the similarity being greater than a threshold value, the liveness test apparatus determines that the test object is a live object. Conversely, in response to the similarity being less than or equal to the threshold value, the liveness test apparatus determines that the test object is a lifeless object.

The liveness test apparatus performs a control operation in response to the result of the liveness test. In one example, in response to a determination that the test object is a live object, the liveness test apparatus generates a control signal to request execution of a user verification process. Conversely, in response to a determination that the test object is a lifeless object, the liveness test apparatus generates a control signal to block access of a user without requesting the execution of the user verification process.

Figure 7A:
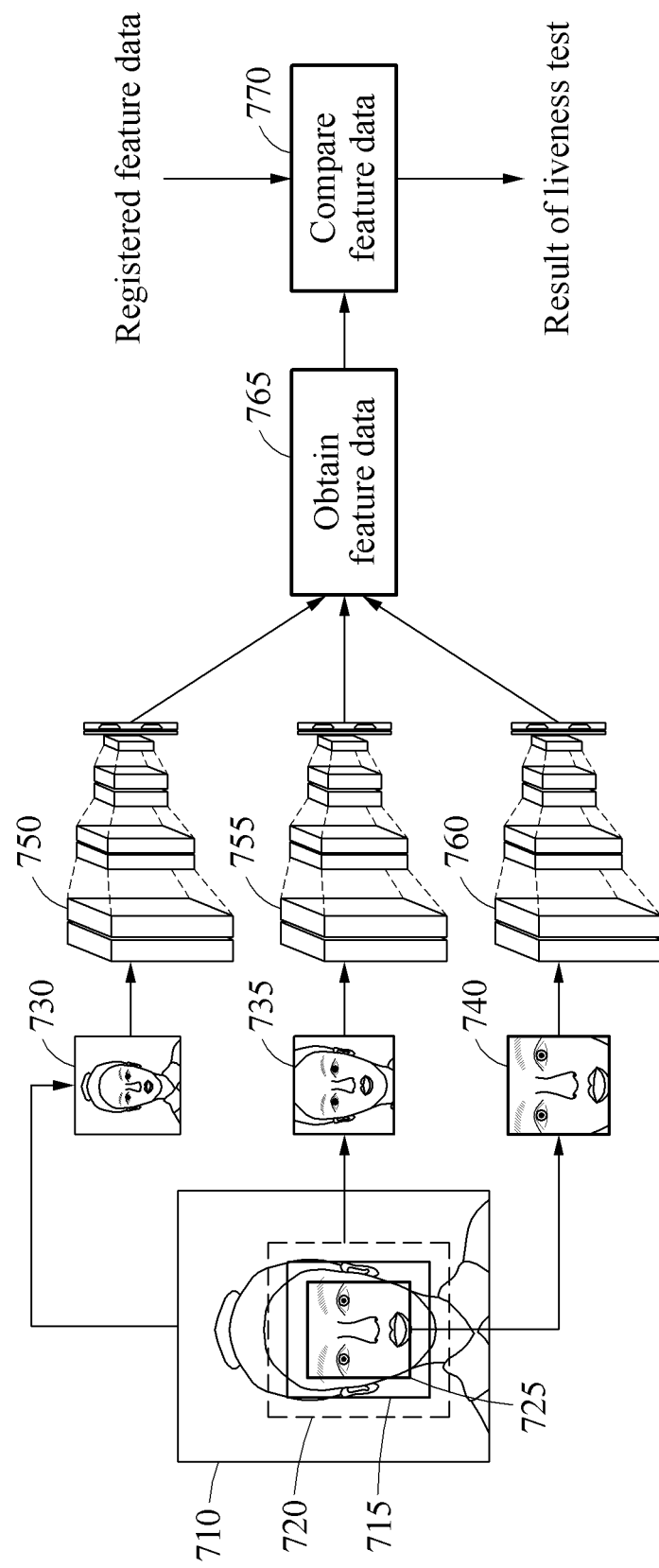

FIGS. 7A and 7B are diagrams illustrating examples of a liveness test method.

Referring to FIG. 7A, when a query image including a test object, which is a target for a liveness test, is input, a face region 715 is detected in the query image. The face region 715 is detected using any of various face detecting methods described herein. Subsequently, at least one test region is determined in the query image based on a liveness test condition registered in a registration DB. In one example, a result of user verification is used to determine a liveness test condition to be applied to the query image among a plurality of liveness test conditions registered in the registration DB. Based on the result of the user verification, a registered user that is closest to the test object is selected from among registered users, and a liveness test condition for the selected registered user is applied to the query image. However, in another example in which a single liveness test condition is registered in the registration DB, the at least one test region in the query image is determined based on the single liveness test condition without using the result of the user verification. Thus, whether the query image is processed using a liveness test condition that is intrinsic to a user registered in a liveness data registration process.

In the example illustrated in FIG. 7A, three test regions are determined in the query image based on a liveness test condition. For example, as illustrated, a first test region 720 corresponding to an entire face region in the query image, a second test region 725 corresponding to a partial face region in the query image, and a third test region 710 corresponding to an entire region of the query image are determined. In this example, a size of the first test region 720 and a location of the second test region 725 are specified by in the liveness test condition. For example, as illustrated, a liveness test condition specifying that a first candidate registration region corresponding to an entire face region has a size larger than that of a detected face region and a second candidate registration region corresponding to a partial face region is at a middle center of the detected face region is registered in a process of registering a liveness test condition.

Image data of an image 735 corresponding to the first test region 720 is input to a first feature extractor 755, image data of an image 740 corresponding to the second test region 725 is input to a second feature extractor 760, and image data of an image 730 corresponding to the third test region 710 is input to a third feature extractor 750. Before the image data of the images 730, 735, and 740 are respectively input to the feature extractors 750, 755, and 760, sizes of the images 730, 735, and 740 are adjusted so that the sizes are equal to one another, either by adjusting the sizes of all three of the images 730, 735, and 740 to be a predetermined size, or adjusting the sizes of two of the images 730, 735, and 740 to be equal to the size of a third one of the images 730, 735, and 740. The image data is a pixel value of a pixel in an image.

In operation 765, feature data, for example, a feature vector, of the test object is obtained from the feature extractors 750, 755, and 760. For example, first feature data corresponding to the image 735 is output from the first feature extractor 755, second feature data corresponding to the image 740 is output from the second feature extractor 760, and third feature data corresponding to the image 730 is output from the third feature extractor 750.

The entire face region corresponding to the first test region 720 includes a shape feature of the test object, and the first feature data determined based on the image 735 corresponding to the first test region 720 represents shape features, for example, light reflection and shape distortion, that are used to detect a face spoofing attack. The partial face region corresponding to the second test region 725 includes a texture feature of the test object, and the second feature data determined based on the image 740 corresponding to the second test region 725 represents a subtle texture difference that is used to detect a face spoofing attack. The entire region of the query image corresponding to the third test region 710 includes a context feature, and the third feature data determined based on the image 730 corresponding to the third test region 710 represents the context feature that is used to detect a face spoofing attack.

By distinguishing a plurality of features using the feature extractors 750, 755, and 760, shape information associated with a shape of a face region, texture information of the face region or a partial face region, and context information of an entire region of the query image are comprehensively considered. Thus, an overall accuracy of the liveness test is enhanced, and it is possible to perform user verification, financial access, or payment access more safely.

In another example, the first feature data, the second feature data, and the third feature data are determined by a single feature extractor. For example, respective image data of the images 730, 735, and 740 are input to separate input layers of the single feature extractor, and the first feature data, the second feature data, and the third feature data are output from a single output layer of the single feature extractor.

In operation 770, the liveness test apparatus compares the obtained feature data and feature data registered in the liveness data registration process, and determines a result of the liveness test based on a result of the comparing. The registered feature data is registered feature data corresponding to the liveness test condition used to determine the test region. In one example, the liveness test apparatus calculates a similarity between the feature data obtained from the feature extractor and the registered feature data, and determines that the test object is a live object in response to the calculated similarity being greater than a threshold value. However, in response to the similarity being less than or equal to the threshold value, the liveness test apparatus determines that the test object is a lifeless object.

FIG. 7B illustrates an example of another liveness test condition different from a liveness test condition described above with reference to FIG. 7A.

In the example illustrated in FIG. 7B, according to a liveness test condition registered in a liveness data registration process, a first test region 722 corresponding to an entire face region in a query image, a second test region 727 corresponding to a partial face region of the query image, and a third test region 710 corresponding to an entire region of the query image are determined. In this example, when registering the liveness test condition, the liveness test condition specifies that a size of a first candidate registration region corresponding to the entire face region is equal to a size of the detected face region, and the second candidate registration region is located at a bottom left of the face region.

Similarly to the example illustrated in FIG. 7A, image data of an image 737 corresponding to the first test region 722 is input to the first feature extractor 755, image data of an image 745 corresponding to the second test region 727 is input to the second feature extractor 760, and image data of an image 730 corresponding to the third test region 710 is input to the third feature extractor 750. A result of the liveness test is then determined based on feature data obtained from the feature extractors 750, 755, and 760, and registered feature data that is registered along with the liveness test condition.

Although the liveness test conditions described above with respect to FIGS. 4A through 7B are based on a size of a first candidate registration region corresponding to an entire face region of a registration image, a location of a second candidate registration region corresponding to a partial face region of the registration image, and a third candidate registration region corresponding to an entire region of the registration image, this is merely an example. In another example, a first liveness test condition is based on the size of the first candidate registration region corresponding to the entire face region of the registration image, a second liveness test condition is based on the location of the second candidate registration region corresponding to the partial face region of the registration image, and a third liveness test condition is based on the third candidate registration region corresponding to the entire region of the registration image. In another example, a first liveness test condition is based on the size of the first candidate registration region corresponding to the entire face region of the registration image and the third candidate registration region corresponding to the entire region of the registration image, and a second liveness test condition is based on the location of the second candidate registration region corresponding to the partial face region of the registration image and the third candidate registration region corresponding to the entire region of the registration image. However, other liveness test conditions may also be used.

Figure 8:
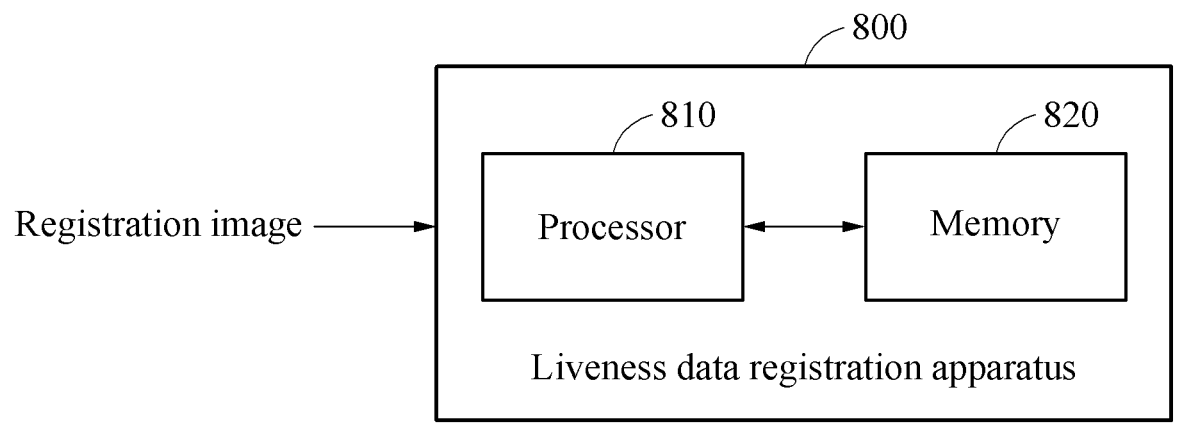
FIG. 8 is a diagram illustrating an example of a liveness data registration apparatus.

FIG. 8 is a diagram illustrating an example of a liveness data registration apparatus.

A liveness data registration apparatus 800 extracts, from a registration image, liveness data of a registration object to be registered, and registers the extracted liveness data. The liveness data registration apparatus 800 performs at least one, some, or all operations described herein in relation to registration of liveness data.

Referring to FIG. 8, the liveness data registration apparatus 800 includes a processor 810 and a memory 820. The memory 820 is connected to the processor 810, and stores instructions that may be executed by the processor 810, data to be operated on or calculated by the processor 810, and/or data processed by the processor 810.

The processor 810 one, some, or all operations described with reference to FIGS. 1 through 5A. For example, the processor 810 detects a face region in a registration image including a registration object to be registered, and determines at least one candidate registration region in the registration image based on the detected face region and a current liveness test condition. The processor 810 obtains feature data of the registration object from image data of the determined at least one candidate registration region using a neural network-based feature extractor, and determines a liveness score based on the obtained feature data. The processor 810 determines whether to register the current liveness test condition and the obtained feature data as liveness data of the registration object based on the determined liveness score. The processor 810 repeats the operations of determining at least one candidate registration region, obtaining feature data from the determined at least one candidate registration region, and determining a liveness score based on the obtained feature data for each liveness test condition. In one example, the processor 810 registers, as liveness data of the registration object, a liveness test condition having a highest liveness score and feature data obtained under the liveness test condition having the highest liveness score.

Figure 9:
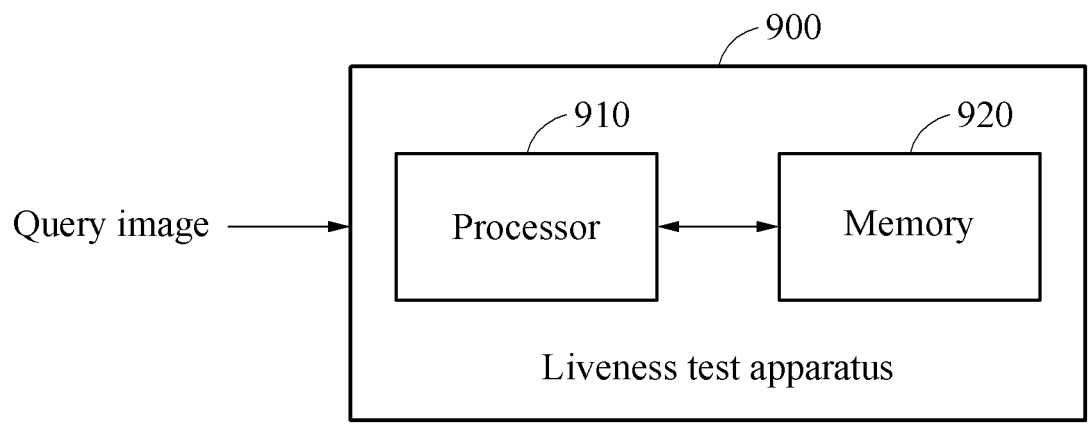
FIG. 9 is a diagram illustrating an example of a liveness test apparatus.

FIG. 9 is a diagram illustrating an example of a liveness test apparatus.

A liveness test apparatus 900 performs a liveness test on a test object in a query image, and provides a result of the liveness test. The liveness test apparatus 900 performs at least one, some, or all operations or stages described herein in regard to a liveness test.

Referring to FIG. 9, the liveness test apparatus 900 includes a processor 910 and a memory 920. The memory 920 is connected to the processor 910, and stores instructions to be executed by the processor 910, data to be processed by the processor 910, and/or data that has been processed by the processor 910.

The processor 910 performs one, some, or all operations or stages described with reference to FIGS. 1, 2, and 6 through 7B. For example, the processor 910 detects a face region in a query image including a test object for a liveness test, and determines a liveness test condition to be applied to the test object among at least one liveness test condition for at least one registered user registered in a registration DB. In one example, the processor 910 determines, as the liveness test condition, either one or both of a size of a first test region and a location of a second test region. The processor 910 determines at least one test region in the query image based on the detected face region and the determined liveness test condition, and obtains feature data of the test object from image data of the determined at least one test region using a neural network-based feature extractor. The processor 910 determines a result of the liveness test based on the obtained feature data registered feature data corresponding to the determined liveness test condition. For example, the processor 910 compares the obtained feature data with the registered feature data corresponding to the determined liveness test condition, and determines a result of the liveness test based on a result of the comparing.

Figure 10:
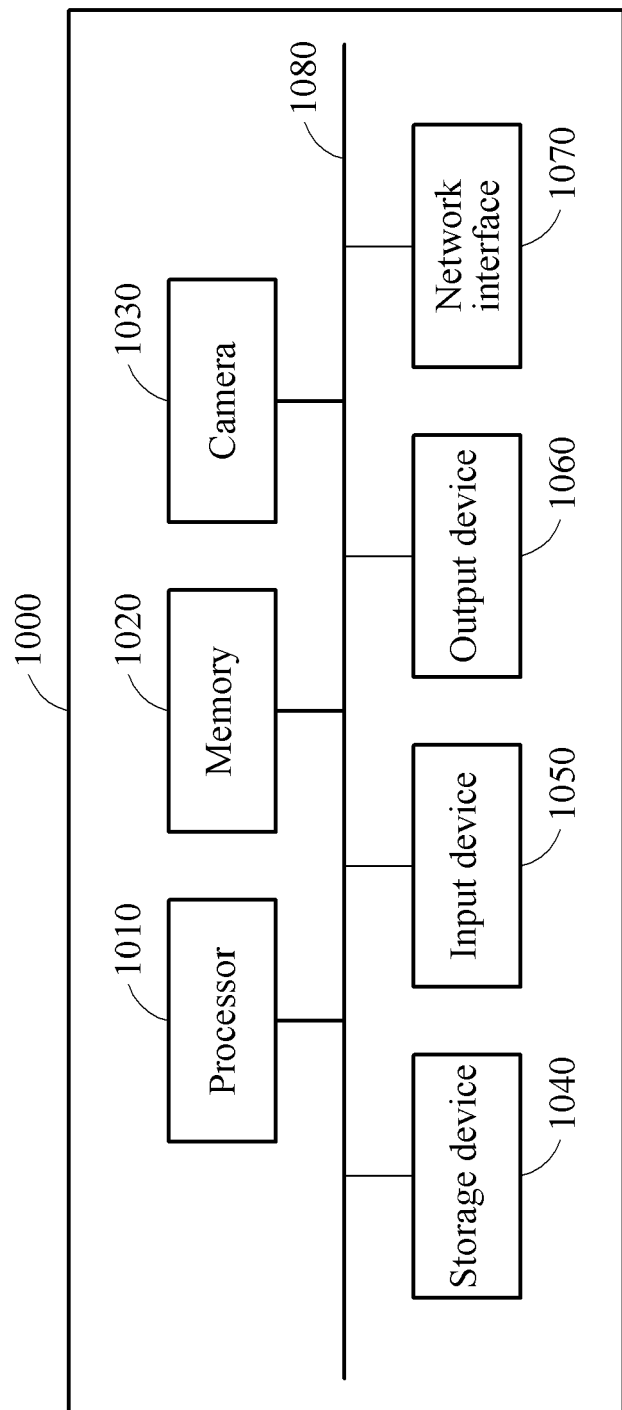
FIG. 10 is a diagram illustrating an example of a computing apparatus.

FIG. 10 is a diagram illustrating an example of a computing apparatus.

A computing apparatus 1000 extracts liveness data of a registration object from a registration image in a liveness data registration process, and registers the extracted liveness data. In addition, the computing apparatus 1000 performs a liveness test on a test object in a query image based on the registered liveness data. The computing apparatus 1000 corresponds to the computing apparatus 120 illustrated in FIG. 1, and perform functions of both the liveness data registration apparatus 800 described with reference to FIG. 8 and the liveness test apparatus 900 described with reference to FIG. 9.

Referring to FIG. 10, the computing apparatus 1000 includes a processor 1010, a memory 1020, a camera 1030, a storage device 1040, an input device 1050, an output device 1060, a network interface 1070, and a communication bus 1080. The processor 1010, the memory 1020, the camera 1030, the storage device 1040, the input device 1050, the output device 1060, and the network interface 1070 communicate with one another through the communication bus 1080.

The processor 1010 performs functions and executes instructions to register liveness data and perform a liveness test. For example, the processor 1010 executes instructions stored in the memory 1020 or the storage device 1040. The processor 1010 performs one, some, or all operations or stages described with reference to FIGS. 1 through 9.

The memory 1020 stores information used to register liveness data and perform a liveness test. The memory 1020 includes a computer-readable storage medium or a computer-readable storage device. The memory 1020 stores instructions to be executed by the processor 1010 and information needed to perform a liveness test.

The camera 1030 either one or both of a registration image for use in registering liveness data and a query image for use in performing a liveness test.

The storage device 1040 includes a computer-readable storage medium or a computer-readable storage device. The storage device 1040 stores a greater amount of information than the memory 1020 for a longer period of time than the memory 1020. The storage device 1040 includes, for example, any one or any combination of any two or more of a magnetic hard disk, an optical disk, a flash memory, an electrically erasable programmable read-only memory (EPROM), a floppy disk, and any other types of nonvolatile memory.

The input device 1050 receives an input from a user, for example, any one or any combination of any two or more of a tactile input, a video input, an audio input, and a touch input. The input device 1050 detects the input from, for example, any one or any combination of any two or more of a keyboard, a mouse, a touchscreen, a microphone, and the user, and transfers the detected input to the computing apparatus 1000.

The output device 1060 provides the user with an output of the computing apparatus 1000 from any one or any combination of any two or more of a visual channel, an audio channel, and a tactile channel. The output device 1060 includes, for example, any one or any combination of any two or more of a display, a touchscreen, a speaker, a vibration generator, and any device configured to provide the user with the output.

The network interface 1070 communicates with an external device through a wired or wireless network.

The computing apparatus 120 in FIG. 1, the candidate registration region determiner 220, the feature data acquirer 225, the liveness data registerer 230, the registration database (DB) 235, the test region determiner 250, the feature data acquirer 255, and the liveness determiner 260 in FIG. 2, the feature extractors 465, 470, and 475 in FIGS. 4A and 4B, the feature extractors 750, 755, and 760 in FIGS. 7A and 7B, the liveness data registration apparatus 800, the processor 810, and the memory 820 in FIG. 8, the liveness test apparatus 900, the processor 910, and the memory 920 in FIG. 9, and the computing apparatus 1000, the processor 1010, the memory 1020, the camera 1030, the storage device 1040, the input device 1050, the output device 1060, the network interface 1070, and the communication bus 1080 in FIG. 10 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1 through 7B that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented liveness test method comprising:
    detecting a face region in a query image, the query image comprising a test object for a liveness test;
    determining a liveness test condition to be applied to the test object among at least one liveness test condition for at least one registered user registered in a registration database;
    determining at least one test region in the query image based on the detected face region and the determined liveness test condition;
    obtaining feature data of the test object from image data of the determined at least one test region using a neural network-based feature extractor; and
    determining a result of the liveness test based on the obtained feature data and registered feature data registered in the registration database and corresponding to the determined liveness test condition.

2. The processor-implemented liveness test method of claim 1, wherein the liveness test condition comprises either one of both of a size of a first test region and a location of a second test region.

3. The processor-implemented liveness test method of claim 1, wherein the determining of the at least one test region comprises determining either one or both of a first test region and a second test region based on the detected face region and the determined liveness test condition.

4. The processor-implemented liveness test method of claim 3, wherein the determining of the either one or both of the first test region and the second test region comprises determining, to be the first test region, one of a first region having a size larger than a size of the detected face region, a second region having a size equal to the size of the detected face region, and a third region having a size smaller than the size of the detected face region based on the determined liveness test condition.

5. The processor-implemented liveness test method of claim 3, wherein the determining of the either one or both of the first test region and the second test region comprises determining, to be the second test region, a partial face region having a location in the detected face region determined based on the determined liveness test condition.

6. The processor-implemented liveness test method of claim 3, wherein the obtaining of the feature data of the test object comprises obtaining the feature data of the test object based on the determined either one or both of the first test region and the second test region, and a third test region corresponding to an entire region of the query image.

7. The processor-implemented liveness test method of claim 1, wherein the determining of the liveness test condition comprises, in response to a single liveness test condition for a single registered user being registered in the registration database, determining the single liveness test condition for the single registered user to be the liveness test condition to be applied to the test object.

8. The processor-implemented liveness test method of claim 1, wherein the determining of the liveness test condition comprises, in response to a plurality of liveness test conditions for a plurality of registered users being registered in the registration database:
    performing user recognition on the test object to determine a registered user corresponding to the test object among the registered users; and determining, to be the liveness test condition to be applied to the test object, a liveness test condition for the registered user corresponding to the test object among the liveness test conditions.

9. The processor-implemented liveness test method of claim 1, wherein the determining of the liveness test condition comprises, in response to a plurality of liveness test conditions for a plurality of registered users being registered in the registration database:
displaying identifiers respectively corresponding to the liveness test conditions;
receiving data for selecting one of the displayed identifiers from a user input; and
determining, to be the liveness test condition to be applied to the test object, a liveness test condition corresponding to one of the displayed identifiers selected based on the data received from the user input.

10. The processor-implemented liveness test method of claim 1, wherein the at least one test region comprises a plurality of test regions, and
the obtaining of the feature data of the test object comprises obtaining the feature data of the test object using separate feature extractors to which image data of the plurality of test regions are respectively input.

11. The processor-implemented liveness test method of claim 1, wherein the at least one test region comprises a plurality of test regions, and
the obtaining of the feature data of the test object comprises obtaining the feature data of the test object using a single feature extractor comprising separate input layers to which image data of the plurality of test regions are respectively input.

12. The processor-implemented liveness test method of claim 1, wherein the determining of the result of the liveness test comprises determining whether the test object is a live object based on a similarity between the obtained feature data and the registered feature data.

13. A non-transitory computer-readable medium storing instructions that, when executed by a processor, cause the processor to perform the processor-implemented liveness test method of claim 1.

14. A liveness test apparatus for determining liveness of a test object for a liveness test, the liveness test apparatus comprising:
a processor configured to:
detect a face region in a query image, the query image comprising the test object;
determine a liveness test condition to be applied to the test object among at least one liveness test condition for at least one registered user registered in a registration database;
determine at least one test region in the query image based on the detected face region and the determined liveness test condition;
obtain feature data of the test object from image data of the determined at least one test region using a neural network-based feature extractor; and
determine a result of the liveness test based on the obtained feature data and registered feature data registered in the registration database and corresponding to the determined liveness test condition.

15. The liveness test apparatus of claim 14, further comprising a memory configured to store instructions executable by the processor;
wherein the processor is further configured to execute the instructions to configure the processor to:
detect the face region in the query image, the query image comprising the test object;
determine the liveness test condition to be applied to the test object among the at least one liveness test condition for the at least one registered user registered in the registration database;
determine the at least one test region in the query image based on the detected face region and the determined liveness test condition;
obtain the feature data of the test object from the image data of the determined at least one test region using the neural network-based feature extractor; and
determine the result of the liveness test based on the obtained feature data and the registered feature data registered in the registration database and corresponding to the determined liveness test condition.

16. The liveness test apparatus of claim 14, wherein the liveness test condition comprises either one or both of a size of a first test region and a location of a second test region.

17. A processor-implemented liveness test method comprising:
obtaining a query image comprising a test object for a liveness test for an individual;
obtaining, using a neural network-based feature extractor, feature data of the test object from image data of the query image based on a liveness test condition personalized for a registered user; and
performing the liveness test on the test object based on a comparison of the obtained feature data and registered feature data previously obtained for the registered user.

18. The processor-implemented liveness test of claim 17, wherein the liveness test condition specifies either one or both of a size of a first test region and a location of a second test region; and
the obtaining of the feature data comprises obtaining the feature data from either one or both of image data of a first test region of the query image having the size specified by the liveness test condition and image data of a second test region of the query image at the location specified by the liveness test condition using the neural network-based feature extractor.

19. The processor-implemented liveness test of claim 17, wherein the registered feature data previously obtained for the registered user was obtained under the liveness test condition personalized for the registered user.

20. The processor-implemented liveness method of claim 17, wherein the processor-implemented liveness test method is performed in a computing apparatus configured to determine whether to unlock the computing apparatus dependent on a result of the liveness test.

* * * * *